Dec. 13, 1927.

G. M. EATON

FLEXIBLE GEAR

Filed Jan. 2, 1924

WITNESSES:

INVENTOR
George M. Eaton
BY
ATTORNEY

Dec. 13, 1927.  1,652,520
G. M. EATON
FLEXIBLE GEAR
Filed Jan. 2, 1924   2 Sheets-Sheet 2

WITNESSES:

INVENTOR
George M. Eaton.
BY
ATTORNEY

Patented Dec. 13, 1927.

1,652,520

UNITED STATES PATENT OFFICE.

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR.

Application filed January 2, 1924. Serial No. 683,912.

My invention relates to flexible elements and, more particularly, to flexible elements utilized in gear-wheels and a method of assembling the same.

It is among the objects of my invention to provide a flexible device in the form of a unitary structure that may be embodied as a standard element in flexible gear-wheels, or the like, which shall be of simple, compact and durable mechanical construction, and which shall be adapted to be assembled in a simple manner, thereby greatly reducing the cost and time of manufacture.

It is another object of my invention to provide a flexible gear element for use in gear-wheel structures of the type in which the rim member is spherically movable relative to its supporting hub, the flexible element being especially adapted to fit into a recessed portion of the spider, and the entire gear element being designed to provide adequate lubrication for the relatively movable parts.

In my copending application, Serial No. 683,369 filed Dec. 29, 1923, I have described a flexible gear element embodying a spring member comprising a cage ring having spring leaves secured therein by wedges to constitute a unitary structure.

My present application is directed to such a spring element, but which differs from the cage-ring structure in that the retaining ring does not carry the spring elements, but is secured thereto by a shrink fit supplemented by welding. With this type of construction, it is possible to maintain equal widths of the spring members and the retaining ring, which requires less space in the rim spider of the gear wheel. My present structure further lends itself to a more efficient process of manufacture than has been possible heretofore.

In the accompanying drawings constituting a part hereof and in which like reference characters designate like parts, Figure 1 is a view partially in section and partially in elevation, of a fragmentary portion of a flexible element embodying the principles of my invention;

Figure 1:
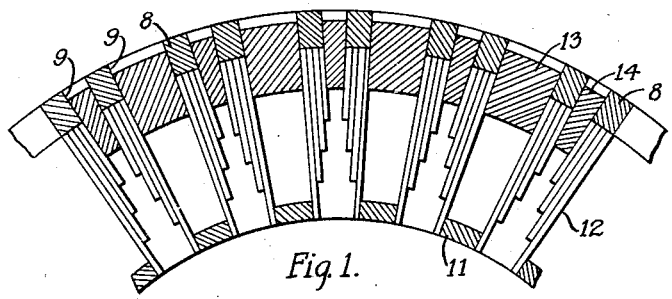
Figure 2:
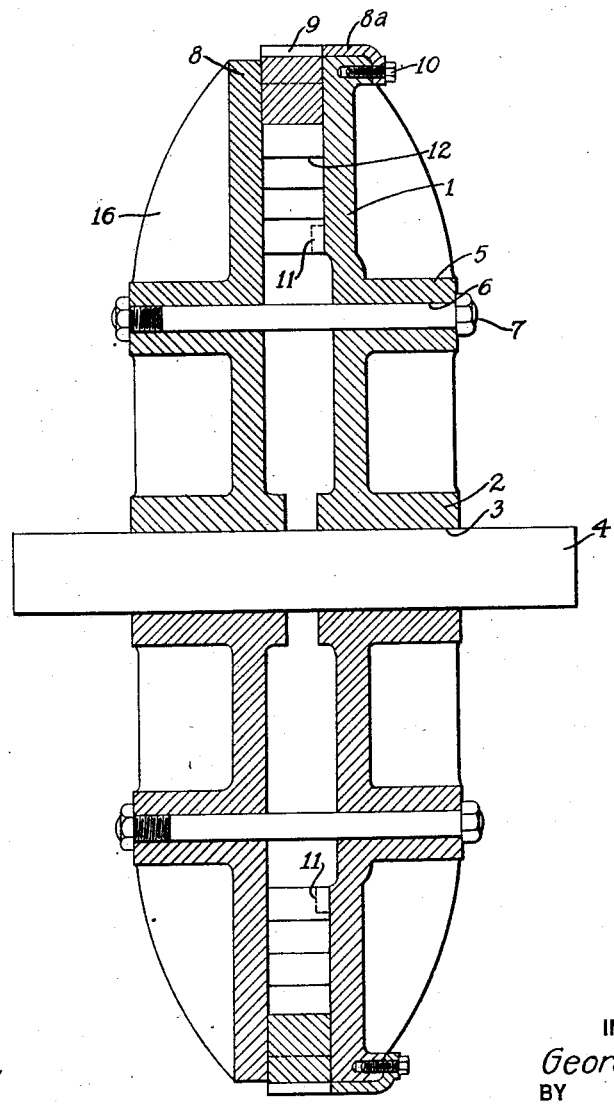
Fig. 2 is a transverse sectional and elevational view of the spring element secured in an assembly jig.

Referring to Fig. 2, I provide an assembly jig comprising a flanged base 1, having a hub portion 2 with a central opening 3 therein adapted to receive a shaft or pin 4. The base 1 further embodies a plurality of integral bosses 5, which are provided with openings 6 for receiving clamping bolts 7, as hereinafter set forth. A flange ring 8, having slotted openings 9, is provided with a circumferential flange 8a, which is secured to the flanged portion of the base 1 by cap screws 10, the slots 9 being alternately wide and narrow, as shown in Fig. 1. The base 1 is further provided with axially extending internal lugs 11, which function as spacers for a plurality of spring elements 12 that are assembled in clusters and are of varying lengths.

A plurality of wide and narrow wedges 13 and 14, respectively, are disposed in the corresponding openings 9 to retain the spring clusters 12 in their proper position, in line with the spacers 11 and the flange ring 8. The unslotted portion of the ring 8 is of slightly less thickness than the corresponding dimension of the spring clusters to permit the wedges 13 and 14 to take effect in securing the spring members.

The wedge members 13 and 14 are gradually driven inwardly to clamp the springs 12, this result being accomplished by tightening the wedges uniformly all around to insure uniform distribution of the clamping action on the spring members. A clamping plate 16, substantially similar in form to the base plate 1, is disposed on the assembled spring elements and secured by the clamping bolts 7. The flange ring 8 is thereupon removed and the entire jig is mounted in a suitable grinding device for circle grinding the outer periphery of the spring and wedge members.

Figure 3:
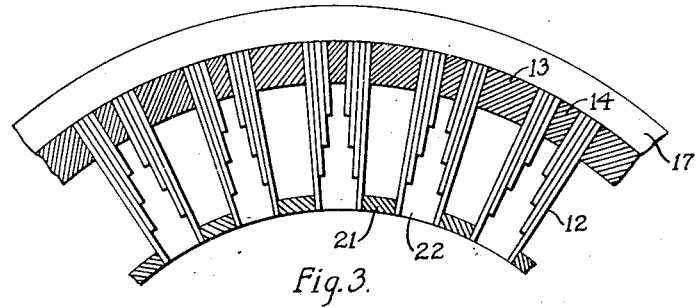
Fig. 3 is a view, partially in section and partially in elevation, of a fragmentary portion of the spring element showing the retaining ring member secured in place.

A retaining ring 17 (Figs. 3 and 4) is then shrunk on the assembled spring and wedge elements to permanently secure them in place, and the assembled structure may then be removed from the jig and welded at the joints 18 to permanently secure the spring, wedge, and ring elements.

The assembled spring element may be assembled in a flexible gear of the type embodying a hub member 19 having a substantially spherically-curved seating surface 20 and a central flange or rim portion 21, which is provided with slotted openings 22 for receiving the spring elements 12. A gear rim 23, having a toothed outer periphery 24, is shrunk on a pair of spiders 25, which are positioned on the respective sides of the spring elements. The spiders 25 severally have seating flanges of complementary shape to the spherically-curved portion 20 of the hub 19 to thus co-operatively engage the same. This engagement of the spiders and hub is a bearing fit, to permit relative movement thereof.

Figure 4:
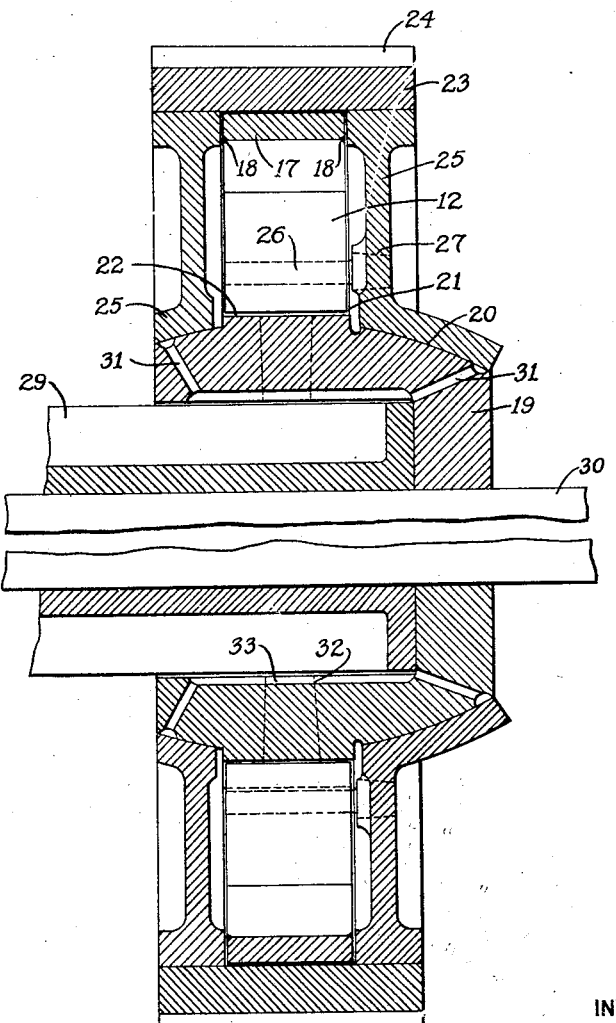
Fig. 4 is a transverse cross-sectional view of a gear-wheel embodying the spring element, which is mounted intermediate the rim and hub members.

The flexible spring element is disposed between the spiders 25, as shown in Fig. 4, the ring member 17 having a bearing fit with the gear rim 23 and with the spiders to permit relative movement therebetween. A plurality of removable fingers 26 are secured in openings 27 of the spider to effect co-operative engagement of the latter with the spring elements 12; or the fingers 26 may be integral with the spider 25. A main journal 29 supports the hub 19, which is further secured to an axle 30 by a press-fit, or in any other suitable manner. Lubrication is provided through ports 31 to the curved seating surfaces of the hub and spider.

As a modification of the engagement of the spring elements 12 in the openings 22 of the hub 19, I may provided a plurality of openings 32 in the latter, which are adapted to receive pin members 33, for engaging said springs.

This type of gear construction permits of relative axial misalinement of the gear rim and its supporting hub, which is utilized to advantage in drive mechanisms where the driving and driven shafts are subject to such misalinement, for the purpose of maintaining constant proper tooth engagement of the meshing gear-wheels.

It is evident, from the foregoing description of my invention, that flexible spring elements made in accordance therewith will provide simple and efficient structures for flexible gear-wheels that are especially applicable to drive mechanisms of electrical railway vehicles, although their use is obviously not limited thereto.

Although I have described a specific embodiment of my invention, it will be obvious to those skilled in the art that various modifications may be made in the details of construction without departing from the principles herein set forth.

I claim as my invention:—

1. A flexible element comprising a ring, a plurality of spring elements and spacing wedges for said elements, said ring being shrunk on said springs and wedges.

2. A flexible element comprising a ring, a plurality of spring elements and spring wedges for said elements, said ring being shrunk and welded on said springs and wedges.

3. A flexible element comprising a gear rim, a hub therefor, a spider engaging said hub and a spring element disposed in said spider, said element comprising a ring, a plurality of springs and spacing wedges, constituting a unitary structure.

4. A flexible element comprising a gear rim, a hub therefor, a spider engaging said hub and a spring element disposed in said spider, said element comprising a ring, a plurality of springs of substantially the same axial width as the ring and spacing wedges, constituting a unitary structure.

5. A flexible element comprising a gear rim, a hub having a substantially spherically-curved seating surface, a spider having a complementary shaped seating surface to co-operatively engage said hub, and a spring element comprising a plurality of symmetrically disposed radially extending leaf springs, spacing wedges therefor and a ring of substantially the same axial width as said springs shrunk thereon, said ring being angularly movable relatively to said gear rim.

6. A flexible element comprising a gear rim, a hub having a substantially spherically-curved seating surface, a spider having a complementary shaped seating surface to co-operatively engage said hub, and a spring element comprising a plurality of symmetrically disposed radially extending leaf springs, spacing wedges therefor and a ring of substantially the same axial width as said spring shrunk thereon, said ring being angularly movable relatively to said gear rim, and said springs being co-operatively engaged with said hub and gear rim.

In testimony whereof, I have hereunto subscribed my name this 22nd day of December, 1923.

GEORGE M. EATON.